United States Patent
Lim et al.

(10) Patent No.: US 10,928,109 B2
(45) Date of Patent: Feb. 23, 2021

(54) LINEAR COMPRESSOR

(71) Applicant: LG Electronics Inc., Seoul (KR)

(72) Inventors: Jaeyoun Lim, Seoul (KR); Byunghoon Woo, Seoul (KR); Hyosang Yu, Seoul (KR); Seongho Ha, Seoul (KR); Jungwan Heo, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/099,000

(22) PCT Filed: Apr. 7, 2017

(86) PCT No.: PCT/KR2017/003818
§ 371 (c)(1),
(2) Date: Nov. 5, 2018

(87) PCT Pub. No.: WO2017/191904
PCT Pub. Date: Nov. 9, 2017

(65) Prior Publication Data
US 2019/0178538 A1    Jun. 13, 2019

(30) Foreign Application Priority Data
May 3, 2016    (KR) .......... 10-2016-0054887

(51) Int. Cl.
*F25B 31/02* (2006.01)
*F04B 35/04* (2006.01)
(Continued)

(52) U.S. Cl.
CPC ............ *F25B 31/023* (2013.01); *F04B 35/04* (2013.01); *F04B 35/045* (2013.01);
(Continued)

(58) Field of Classification Search
CPC .. F25B 31/023; F25B 2309/001; F04B 35/04; F04B 35/045; F04B 39/0044;
(Continued)

(56) References Cited

U.S. PATENT DOCUMENTS 3,788,778 A * 1/1974 Miller .................. F04B 35/045
                                                      417/417
3,862,751 A * 1/1975 Schwaller ............... F16F 1/125
                                                      267/91
(Continued)

FOREIGN PATENT DOCUMENTS

CN    1432107    7/2003
CN    1492969    4/2004
(Continued)

OTHER PUBLICATIONS

Machine Translation of KR-1019980017407.*
(Continued)

*Primary Examiner* — Christopher S Bobish
(74) *Attorney, Agent, or Firm* — Fish & Richardson P.C.

(57) ABSTRACT

A linear compressor includes: a shell; a cylinder provided inside the shell; a frame coupled to an outer side of the cylinder; a piston configured to reciprocate in an axial direction; a motor that supplies power to the piston; and a spring mechanism coupled to the piston. The spring mechanism includes: a support connected to the piston and including a spring support unit having one or more insertion holes; a first coupling protrusion that extends from the rear side of the spring support unit along the edge of the insertion hole; a support cap inserted into the insertion hole and including a second coupling protrusion protruding from the front side of the spring support unit; a first resonant spring inserted into the outer circumferential surface of the second coupling (Continued)

protrusion; and a second resonant spring inserted into the outer circumferential surface of the first coupling protrusion.

11 Claims, 9 Drawing Sheets

(51) Int. Cl.
    *F04B 39/00*     (2006.01)
    *F16F 1/12*     (2006.01)
    *F16F 15/067*     (2006.01)
    *F04B 39/12*     (2006.01)
    *H02K 33/02*     (2006.01)

(52) U.S. Cl.
    CPC ...... *F04B 39/0044* (2013.01); *F04B 39/0072* (2013.01); *F16F 1/125* (2013.01); *F16F 1/126* (2013.01); *F16F 15/067* (2013.01); *F04B 39/0061* (2013.01); *F04B 39/121* (2013.01); *F04B 39/122* (2013.01); *F04B 39/127* (2013.01); *F16F 2226/047* (2013.01); *F25B 2309/001* (2013.01); *H02K 33/02* (2013.01)

(58) Field of Classification Search
    CPC ...... F16F 2226/047; F16F 3/04; F16F 15/067; F16F 1/125; F16F 1/126
    See application file for complete search history.

(56) References Cited

U.S. PATENT DOCUMENTS

| | | | | |
|---|---|---|---|---|
| 5,597,294 | A * | 1/1997 | McGrath | F04B 35/04 417/417 |
| 5,603,612 | A * | 2/1997 | McGrath | F04B 35/04 417/417 |
| 5,727,932 | A * | 3/1998 | McGrath | F04B 35/04 417/417 |
| 6,004,113 | A * | 12/1999 | Vay | F04B 39/127 248/624 |
| 6,435,842 | B2 * | 8/2002 | Song | F04B 35/045 267/109 |
| 7,306,438 | B2 * | 12/2007 | Kang | F04B 35/045 181/229 |
| 7,722,335 | B2 * | 5/2010 | Kim | F04B 35/045 248/638 |
| 7,775,775 | B2 * | 8/2010 | Cho | F04B 35/045 417/244 |
| 8,747,081 | B2 * | 6/2014 | Kang | F04B 35/045 310/15 |
| 8,899,200 | B2 * | 12/2014 | Aoki | F01L 1/462 123/90.48 |
| 9,062,669 | B2 * | 6/2015 | Hong | F04B 35/045 |
| 9,670,933 | B2 * | 6/2017 | Yoo | F04D 27/005 |
| 2005/0098031 | A1 * | 5/2005 | Yoon | F04B 35/045 92/84 |
| 2005/0175482 | A1 * | 8/2005 | Park | F04B 35/045 417/416 |
| 2006/0153712 | A1 * | 7/2006 | Park | F04B 35/045 417/417 |
| 2006/0210411 | A1 | 9/2006 | Hyeon | |
| 2007/0134108 | A1 * | 6/2007 | Her | F04B 35/045 417/417 |
| 2008/0211156 | A1 * | 9/2008 | Check | F01L 1/462 267/170 |
| 2010/0316513 | A1 * | 12/2010 | Lee | F04B 35/045 417/417 |
| 2010/0320660 | A1 * | 12/2010 | Takeda | F16F 1/125 267/168 |
| 2011/0194957 | A1 * | 8/2011 | Kang | F04B 35/045 417/415 |
| 2015/0004017 | A1 * | 1/2015 | Kang | F04B 39/0044 417/363 |
| 2015/0078925 | A1 * | 3/2015 | Choi | F04B 35/045 417/228 |

FOREIGN PATENT DOCUMENTS

| | | |
|---|---|---|
| CN | 1548720 | 11/2004 |
| CN | 1548727 | 11/2004 |
| CN | 1637289 | 7/2005 |
| CN | 1243914 | 3/2006 |
| CN | 1759244 | 4/2006 |
| CN | 1771393 | 5/2006 |
| CN | 101835976 | 9/2010 |
| CN | 101975151 | 2/2011 |
| CN | 204511819 | 7/2015 |
| JP | 2004-011582 | 1/2004 |
| JP | 2004011582 | 1/2004 |
| JP | 2004278475 | 10/2004 |
| KR | 10-1999-0085185 | 12/1999 |
| KR | 10-0869197 | 11/2008 |
| KR | 10-2009-0041706 | 4/2009 |
| KR | 20120111397 | 10/2012 |
| KR | 10-2016-0024217 | 3/2016 |

OTHER PUBLICATIONS

Chinese Office Action in Chinese Application No. 201780025068.7, dated Apr. 26, 2019, 19 pages (with English translation).
Extended European Search Report in European Application No. 17792807.4, dated Oct. 11, 2019, 7 pages.
International Search Report and Written Opinion in International Application No. PCT/KR2017/003818, dated Aug. 8, 2017, 12 pages.
Chinese Notice of Allowance in Chinese Appln. No. 201780025068.7, dated Aug. 4, 2020, 9 pages (with English translation).

* cited by examiner

LINEAR COMPRESSOR

CROSS-REFERENCE TO RELATED APPLICATIONS

This application is a National Stage application under 35 U.S.C. § 371 of International Application No. PCT/KR2017/003818, filed on Apr. 7, 2017, which claims the benefit of Korean Application No. 10-2016-0054887, filed on May 3, 2016. The disclosures of the prior applications are incorporated by reference in their entirety.

TECHNICAL FIELD

The present invention relates to a linear compressor.

BACKGROUND ART

Cooling systems are systems in which a refrigerant circulates to generate cool air. In such a cooling system, processes of compressing, condensing, expanding, and evaporating of the refrigerant are repeatedly performed. The cooling system includes a compressor, a condenser, an expansion device, and an evaporator. Also, the cooling system may be installed in a home appliance including a refrigerator or an air conditioner.

In general, compressors are machines that receive power from a power generation device including an electric motor or a turbine to compress air, a refrigerant, or various gaseous working fluids, thereby increasing a pressure and a temperature. Also, the compressors are being widely used in home appliances or industrial fields.

Such a compressor is largely classified into a reciprocating compressor, a scroll compressor, and a rotary compressor.

In recent years, the development of a linear compressor belonging to one kind of reciprocating compressors is being actively carried out. The linear compressor may be directly connected to a driving motor, in which a piston is linearly reciprocates, to improve compression efficiency without mechanical losses due to the movement conversion and have a simple structure.

In general, the linear compressor suctions a gaseous refrigerant while a piston moves to linearly reciprocate within a cylinder by a linear motor and then compresses the suctioned refrigerant at a high-temperature and a high-pressure to discharge the compressed refrigerant.

A linear compressor provided with a linear motor is disclosed in Korean Patent Publication No. 10-2006-0119296 (Publication Date: Nov. 24, 2006) that is a prior art document.

The linear compressor disclosed in the prior art document includes a cylinder block, a linear motor disposed on one side of the cylinder block, and a core cover coupled to the cylinder block through a bolt by using the linear motor as a medium.

A second main spring is supported by the core cover so that a piston is resonant. Also, one side of the second main spring is supported by a spring support. One side of the first main spring is supported by the other side of the spring support. Also, the other side of the first main spring is supported by a back cover.

As described above, the first main spring and the second main spring are supported by the spring support, the back cover, and the core cover. When coupling deformation occurs while the spring support, the back cover, and the core cover are coupled to the peripheral constituents, or a portion supporting a spring is deformed in the state in which the spring is supported, the spring support, the back cover, and the core cover may interfere with the peripheral constituents, and also, the first main spring or the second main spring may not be supported in fixed positions. As a result, the piston may not be properly resonant to generate noise when the piston operates.

DISCLOSURE OF THE INVENTION

Technical Problem

An object of the present invention is to provide a linear compressor in which springs disposed on both sides of a support are disposed in a line to prevent the support from being deformed.

Also, an object of the present invention is to provide a linear compressor in which a state in which an end of each of springs is coupled to a support is maintained when the springs are disposed in a line.

Technical Solution

To achieve the above-described objects, a linear compressor according to an embodiment of the present invention includes: a shell; a cylinder provided in the shell to define a compression space for a refrigerant; a frame coupled to an outside of the cylinder; a piston provided to reciprocate in an axial direction within the cylinder; a motor providing power to the piston; and a spring device connected to the piston and configured to allow the piston to resonate; wherein the spring device includes: a support coupled to the piston and including a spring support having one or more of insertion holes; a first coupling protrusion extending along an edge of each of the insertion holes on a rear surface of the spring support; a support cap inserted into the insertion hole and comprising a second coupling protrusion protruding toward a front surface of the spring support; a first resonant spring fitted into an outer surface of the second coupling protrusion; and a second resonant spring fitted into an outer surface of the first coupling protrusion.

Advantageous Effects

According to the proposed present invention, the first coupling protrusion may be disposed on one surface of the spring support, and the second coupling protrusion may be disposed on the other surface of the spring support. Thus, the springs may be supported by both the surfaces of the spring support, respectively.

In addition, the springs disposed on both the sides of the spring supports may be disposed in a line, and the points of the spring support to which the elastic force of each of the springs is applied may coincide with each other to prevent the spring support from being deformed.

In addition, the spring coupled to the support cap may press the support cap to the spring support in the state in which the support cap is coupled to the spring support to prevent the support cap from being separated from the spring support.

MODE FOR CARRYING OUT THE INVENTION

Hereinafter, exemplary embodiments of the present invention will be described in detail with reference to the accompanying drawings.

Figure 1:
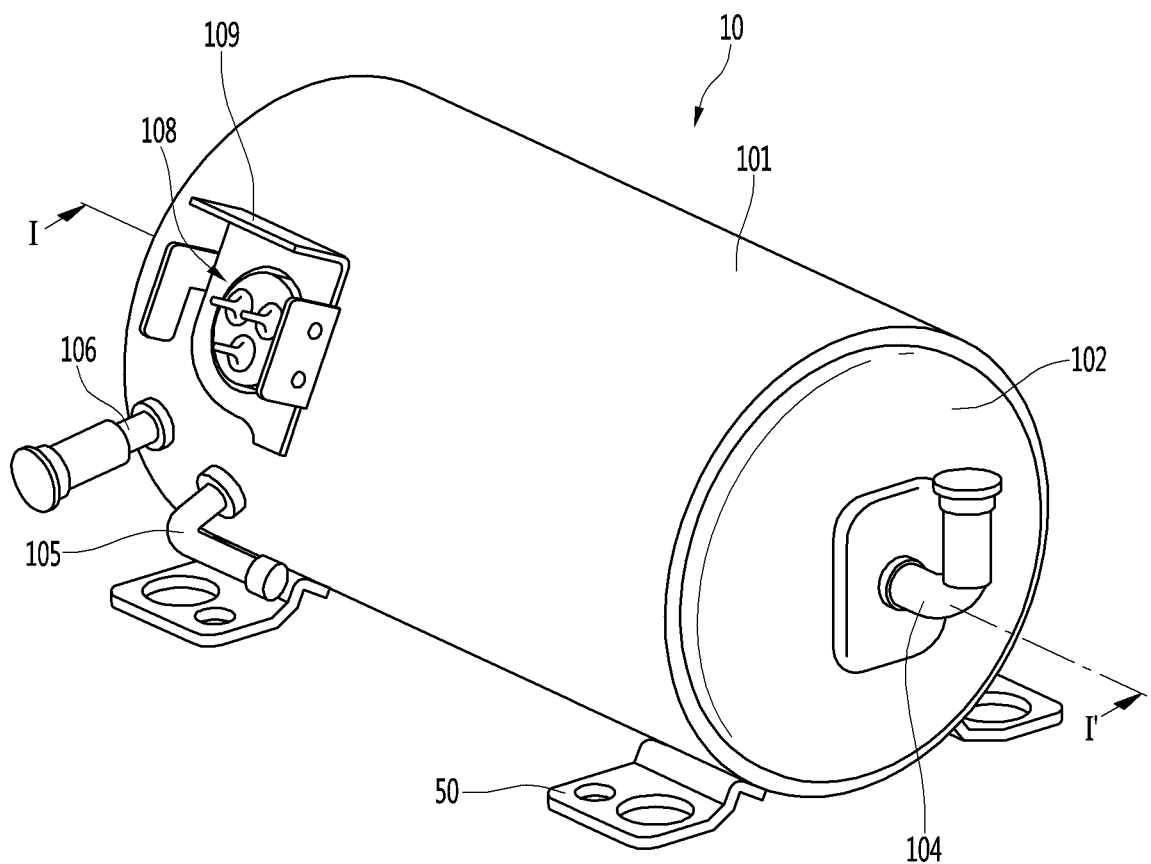
FIG. 1 is a perspective view illustrating an outer appearance of a linear compressor according to an embodiment of the present invention.
Figure 2:
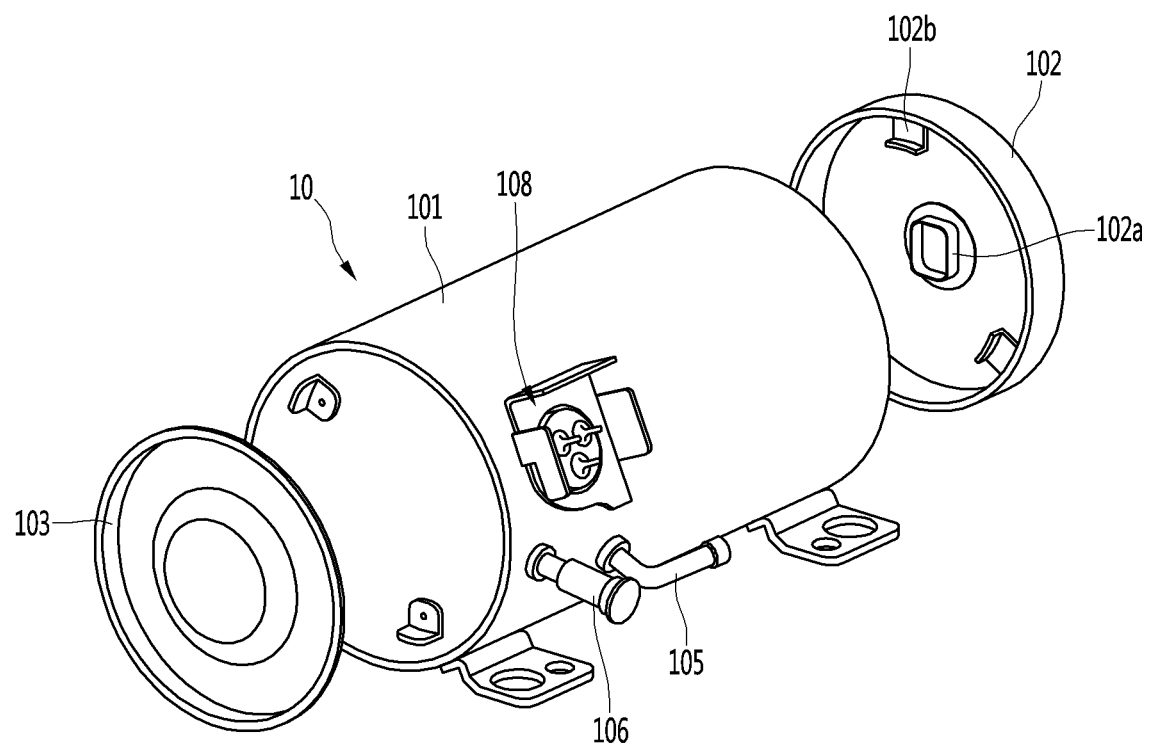
FIG. 2 is an exploded perspective view illustrating a shell and a shell cover of the linear compressor according to an embodiment of the present invention.

FIG. 1 is a perspective view illustrating an outer appearance of a linear compressor according to an embodiment of the present invention, and FIG. 2 is an exploded perspective view illustrating a shell and a shell cover of the linear compressor according to an embodiment of the present invention.

Referring to FIGS. 1 and 2, a linear compressor 10 according to an embodiment of the present invention may include a shell 101 and shell covers 102 and 103 coupled to the shell 101. In a broad sense, each of the shell covers 102 and 103 may be understood as one component of the shell 101.

A leg 50 may be coupled to a lower portion of the shell 101. The leg 50 may be coupled to a base of a product in which the linear compressor 10 is installed. For example, the product may include a refrigerator, and the base may include a machine room base of the refrigerator. For another example, the product may include an outdoor unit of an air conditioner, and the base may include a base of the outdoor unit.

The shell 101 may have an approximately cylindrical shape and be disposed to lie to horizontally or axially extend. In FIG. 1, the shell 101 may extend in the horizontal direction and have a relatively low height in a radial direction. That is, since the linear compressor 10 has a low height, when the linear compressor 10 is installed in the machine room base of the refrigerator, a machine room may be reduced in height.

A terminal 108 may be installed on an outer surface of the shell 101. The terminal 108 may transmit external power to a motor (see reference numeral 140 of FIG. 3) of the linear compressor 10. The terminal 108 may be connected to a lead line of a coil (see reference numeral 141c of FIG. 3).

A bracket 109 is installed outside the terminal 108. The bracket 109 may include a plurality of brackets surrounding the terminal 108. The bracket 109 may protect the terminal 108 against an external impact.

Both side ends of the shell 101 may be opened and be covered by the shell covers 102 and 103. In detail, the shell covers 102 and 103 includes a first shell cover 102 coupled to one opened end of the shell 101 and a second shell cover 103 coupled to the other opened end of the shell 101. An inner space of the shell 101 may be sealed by the shell covers 102 and 103.

In FIG. 1, the first shell cover 102 may be disposed at a right portion of the linear compressor 10, and the second shell cover 103 may be disposed at a left portion of the linear compressor 10. That is to say, the first and second shell covers 102 and 103 may be disposed to face each other.

The linear compressor 10 may further include a plurality of pipes 104, 105, and 106 provided in the shell 101 or the shell covers 102 and 103 to suction, discharge, or inject a refrigerant.

The plurality of pipes 104, 105, and 106 may include a suction pipe 104 through which the refrigerant is suctioned into the linear compressor 10, a discharge pipe 105 through which the compressed refrigerant is discharged from the linear compressor 10, and a process pipe through which the refrigerant is supplemented to the linear compressor 10.

For example, the suction pipe 104 may be coupled to the first shell cover 102. The refrigerant may be suctioned into the linear compressor 10 through the suction pipe 104 and flows in an axial direction of the shell.

The discharge pipe 105 may be connected to the shell 101. The refrigerant suctioned through the suction pipe 104 may flow in the axial direction and then be compressed in a compression space (that will be described later). Also, the compressed refrigerant may be discharged through the discharge pipe 105 to the outside of the compressor 10. The discharge pipe 105 may be disposed at a position that is closer to the second shell cover 103 than the first shell cover 102.

The process pipe 106 may be coupled to an outer circumferential surface of the shell 101. A worker may inject the refrigerant into the linear compressor 10 through the process pipe 106.

The process pipe 106 may be coupled to the shell 101 at a height different from that of the discharge pipe 105 to avoid interference with the discharge pipe 105. The height is understood as a distance from the leg 50 in the vertical direction (or the radial direction of the shell 101). Since the discharge pipe 105 and the process pipe 106 are coupled to the outer circumferential surface of the shell 101 at the heights different from each other, work convenience may be improved.

A first stopper 102b may be disposed on the inner surface of the first shell cover 102. The first stopper 102b may prevent the compressor body 100, particularly, the motor 140 from being damaged by vibration or an impact, which occurs when the linear compressor 10 is carried.

The first stopper 102b is disposed adjacent to a back cover 400 that will be described later. When the linear compressor 10 is shaken, the back cover 400 may come into contact with the first stopper 102b to prevent the motor 140 from directly colliding with the shell 101.

Figure 3:
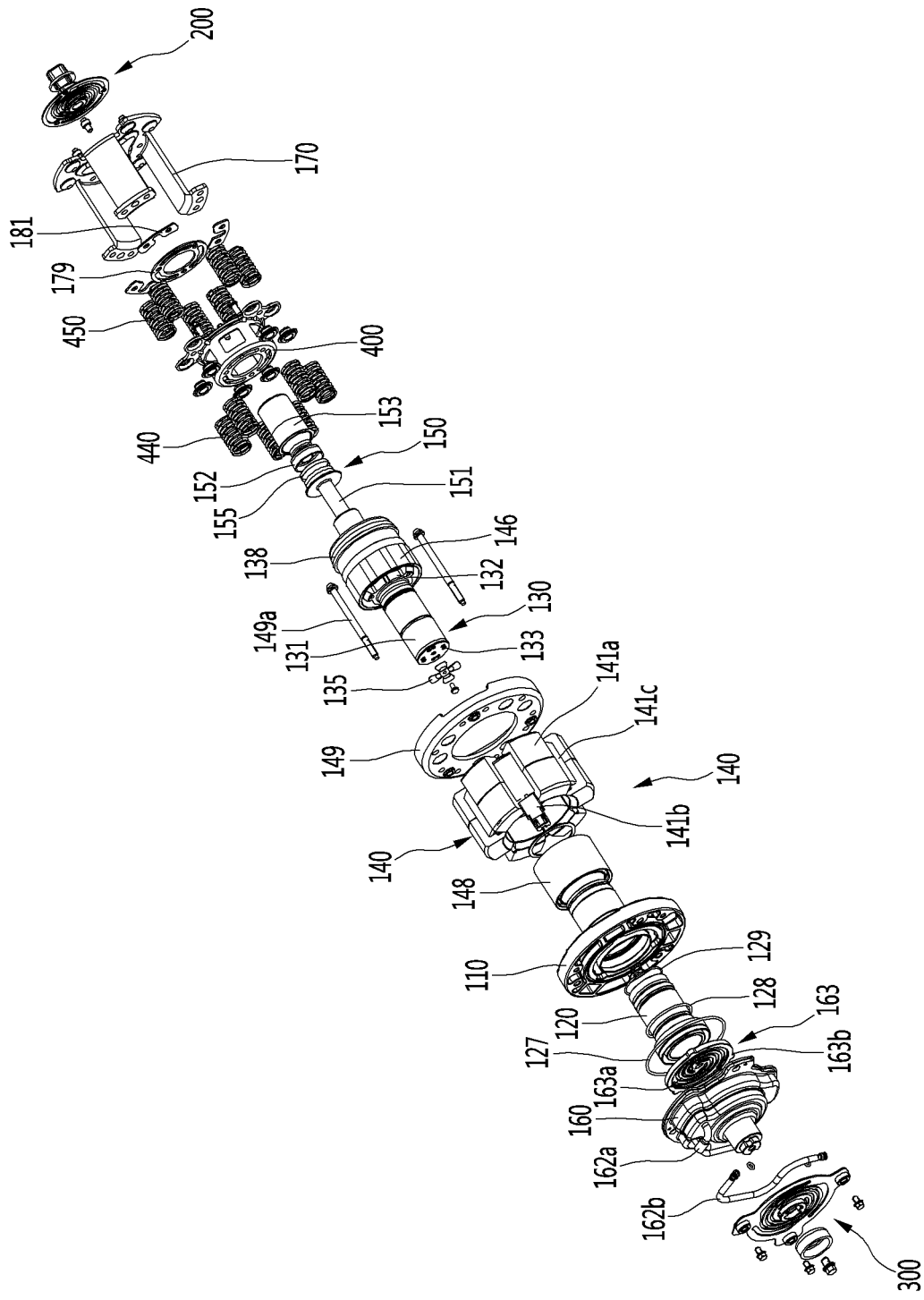
FIG. 3 is an exploded perspective view illustrating internal parts of the linear compressor according to an embodiment of the present invention.
Figure 4:
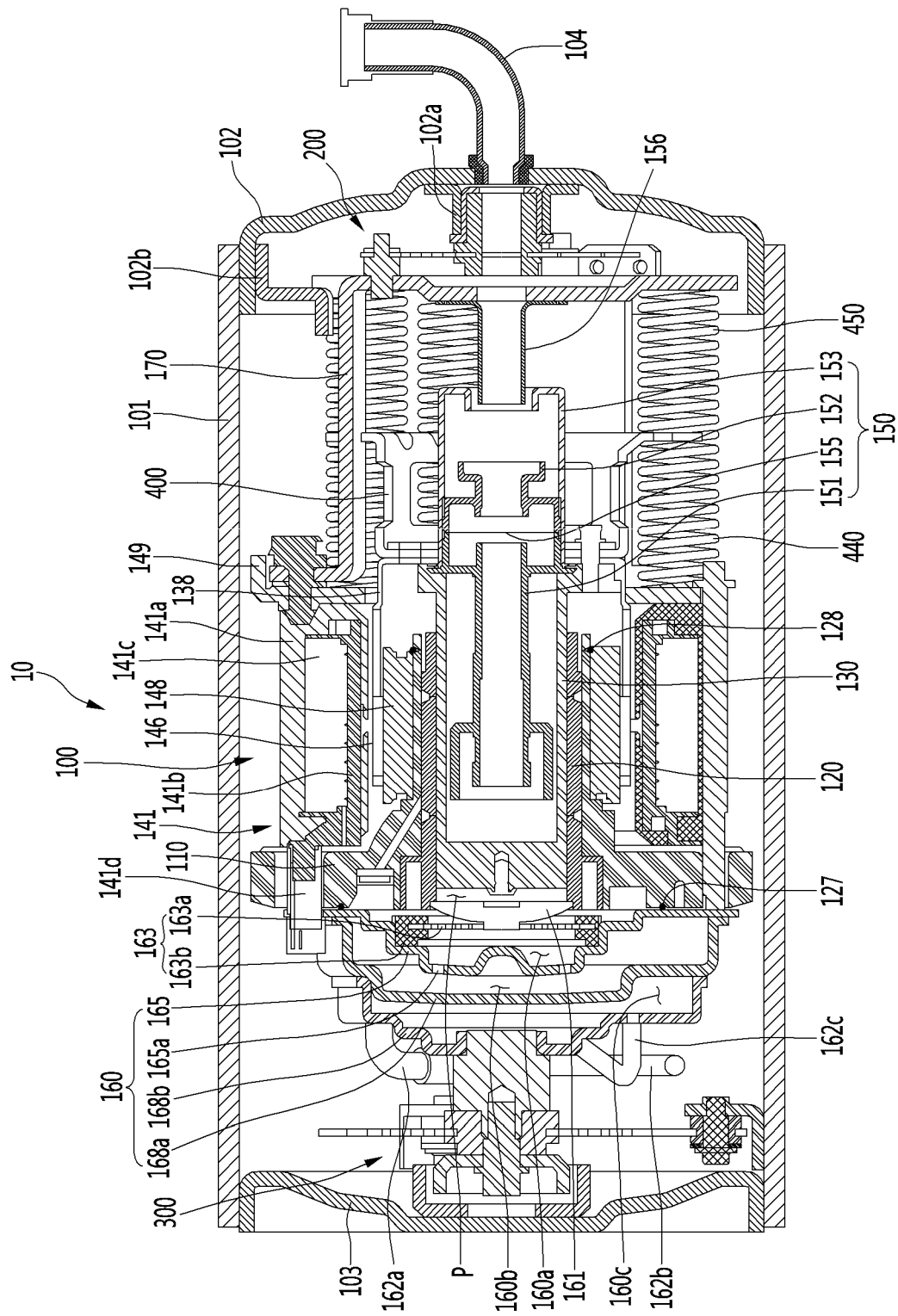
FIG. 4 is a cross-sectional view taken along line I-I' of FIG. 1.

FIG. 3 is an exploded perspective view illustrating internal parts of the linear compressor according to an embodiment of the present invention, and FIG. 4 is a cross-sectional view taken along line I-I' of FIG. 1.

Referring to FIGS. 3 and 4, the linear compressor 10 according to an embodiment of the present invention may include the shell 101, a compressor body 100 accommodated in the shell 101, and a plurality of support devices 200 and 300 supporting the compressor body 100. In detail, one of the plurality of support devices 200 and 300 may be fixed to the shell 101, and the other one may be fixed to a pair of covers 102 and 102. As a result, the compressor body 100 is supported to be spaced apart from the inner circumferential surface of the shell 101.

The compressor body 100 includes a cylinder 120 provided in the shell 101, a piston 130 that linearly reciprocates within the cylinder 120, and a motor 140 applying driving force to the piston 130. When the motor 140 is driven, the piston 130 may reciprocate in the axial direction.

The compressor body 100 may further include a suction muffler 150 coupled to the piston 130 to reduce a noise generated from the refrigerant suctioned through the suction pipe 104.

The refrigerant suctioned through the suction pipe 104 flows into the piston 130 via the suction muffler 150. For example, while the refrigerant passes through the suction muffler 150, the flow noise of the refrigerant may be reduced.

The suction muffler 150 may include a plurality of mufflers 151, 152, and 153. The plurality of mufflers 151, 152, and 153 may include a first muffler 151, a second muffler 152, and a third muffler 153, which are coupled to each other.

The first muffler 151 is disposed within the piston 130, and the second muffler 152 is coupled to a rear side of the first muffler 151. Also, the third muffler 153 accommodates the second muffler 152 therein and extends to a rear side of the first muffler 151. In view of a flow direction of the refrigerant, the refrigerant suctioned through the suction pipe 104 may successively pass through the third muffler 153, the second muffler 152, and the first muffler 151. In this process, the flow noise of the refrigerant may be reduced.

The suction muffler 150 may further include a muffler filter 155. The muffler filter 155 may be disposed on an interface on which the first muffler 151 and the second muffler 152 are coupled to each other. For example, the muffler filter 155 may have a circular shape, and an outer edge of the muffler filter 155 may be disposed on a portion, at which the first and second mufflers 151 and 152 are coupled to each other, and then supported.

Hereinafter, the direction will be defined.

The "axial direction" may be understood as a direction in which the piston 130 reciprocates, i.e., the horizontal direction in FIG. 4. Also, in the axial direction", a direction that is directed from the suction pipe 104 toward a compression space P, i.e., a direction in which the refrigerant flows may be defined as a "front direction", and a direction opposite to the front direction may be defined as a "rear direction".

On the other hand, the "radial direction" may be understood as a direction that is perpendicular to the direction in which the piston 130 reciprocates, i.e., the vertical direction in FIG. 4.

The "axial of the compressor body" represents a central line in the axial direction of the piston 130.

The piston 130 may include a piston body 131 having an approximately cylindrical shape and a piston flange part 132 extending from the piston body 131 in the radial direction. The piston body 131 may reciprocate inside the cylinder 120, and the piston flange part 132 may reciprocate outside the cylinder 120.

The cylinder 120 is configured to accommodate at least a portion of the first muffler 151 and at least a portion of the piston body 131.

The cylinder 120 has a compression space P in which the refrigerant is compressed by the piston 130. Also, a suction hole 133 through which the refrigerant is introduced into the compression space P is defined in a front surface of the piston body 131, and a suction valve 135 for selectively opening the suction hole 133 is disposed on a front side of the suction hole 133. A coupling hole to which a predetermined coupling member is coupled is defined in an approximately central portion of the suction valve 135.

A discharge cover assembly 160 defining a plurality of discharge spaces for the refrigerant discharged from the compression space P and discharge valve assembly 161 and 163 coupled to the discharge cover assembly 160 to selectively discharge the refrigerant compressed in the compression space P are provided at a front side of the compression space P.

In detail, the discharge cover assembly 160 may include a discharge cover 165 coupled to a front surface of the cylinder 120 to accommodate the discharge valve assembly 161 and 163 therein and a plurality of discharge mufflers coupled to a front surface of the discharge cover 165. The plurality of discharge mufflers may include a first discharge muffler 168a coupled to the front surface of the discharge cover 165 and a second discharge muffler 168b coupled to a front surface of the first discharge muffler 168a, and the number of discharge mufflers are not limited thereto.

The plurality of discharge spaces may include a first discharge space 160a defined inside the discharge cover 165, a second discharge space 160b defined between the discharge cover 165 and the first discharge muffler 168a, and a third discharge space 160c defined between the first discharge muffler 168a and the second discharge muffler 168b. The discharge valve assembly 161 and 163 are accommodated in the first discharge space 160a.

One or more of discharge holes 165a are defined in the discharge cover 165, and the refrigerant discharged into the first discharge space 160a is discharged into the second discharge space 160b through the discharge hole 165a and thus is reduced in discharge noise.

The discharge valve assembly 161 and 163 may include a discharge valve 161 that is opened when a pressure of the compression space P is above a discharge pressure to introduce the refrigerant into the discharge space of the discharge cover assembly 160 and a spring assembly 163 fixed to the inside of the discharge cover 165 to provide elastic force in the axial direction to the discharge valve 161.

The spring assembly 163 may include a valve spring 163a applying elastic force to the discharge valve 161 and a spring support 163b for supporting the valve spring 163a to the discharge cover 165.

For example, the valve spring 163a may include a plate spring. Also, the spring support 163b may be integrally injection-molded to the valve spring 163a through an insertion-molding process.

The discharge valve 161 is coupled to the valve spring 163a, and a rear portion or a rear surface of the discharge valve 161 is disposed to be supported on the front surface of the cylinder 120. When the discharge valve 161 is closely attached to the front surface of the cylinder 120, the compression space P is maintained in a sealed state. When the discharge valve 161 is spaced apart from the front surface of the cylinder 120, the compression space P is opened to discharge the refrigerant compressed in the compression space P to the first discharge space 160a.

The compression space P may be a space defined between the suction valve 135 and the discharge valve 161. Also, the suction valve 135 may be disposed on one side of the compression space P, and the discharge valve 161 may be disposed on the other side of the compression space P, i.e., an opposite side of the suction valve 135.

While the piston 130 linearly reciprocates within the cylinder 120, when a pressure of the compression space O is less than that of the inside of the suction muffler 150, the suction valve 135 is opened, and the refrigerant introduced into the suction muffler 150 is suctioned to the compression space P. Also, when the refrigerant increases in flow rate, and thus, the pressure of the compression space P is greater than that of the inside of the suction muffler 150, the suction valve 135 is closed to become a state in which the refrigerant is compressible.

When the pressure of the compression space P is greater than that of the first discharge space 106*a*, the valve spring 163*a* is elastically deformed forward to allow the discharge valve 161 to be spaced apart from the front surface of the cylinder 120. Also, when the discharge valve 161 is opened, the refrigerant is discharged from the compression space P to the first discharge space 160*a*. When the pressure of the compression space P is less than that of the first discharge space 160*a* by the discharge of the refrigerant, the valve spring 163*a* provides restoring force to the discharge valve 161 to allow the discharge valve 161 to be closed.

The compressor body 100 may further include a connection pipe 162*c* connecting the second discharge space 160*b* to the third discharge space 160*c*, a cover pipe 162*a* connected to the second discharge muffler 168*b*, and a loop pipe 162*b* connecting the cover pipe 162*a* to the discharge pipe 105.

The connection pipe 162*c* has one end passing through the first discharge muffler 168*a* and inserted into the second discharge space 160*b* and the other end connected to the second discharge muffler 158*b* to communicate with the third discharge space 160*c*. Thus, the refrigerant discharged to the second discharge space 160*b* may be more reduced in noise while moving to the third discharge space 160*c* along the connection pipe 162*c*. Each of the pipes 162*a*, 162*b*, and 162*c* may be made of a metal material.

The loop pipe 162*a* may have one side coupled to the cover pipe 162*a* and the other side coupled to the discharge pipe 105.

The loop pipe 162*b* may be made of a flexible material. Also, the loop pipe 162*b* may roundly extend from the cover pipe 162*a* along the inner circumferential surface of the shell 101 and be coupled to the discharge pipe 105. For example, the loop pipe 162*b* may be disposed in a wound shape. While the refrigerant flows along the loop pipe 162*b*, the noise may be more reduced.

The compressor body 100 may further include a frame 110. The frame 110 may be a part for fixing the cylinder 120. For example, the cylinder 120 may be press-fitted into the frame 110.

The frame 110 may be disposed to surround the cylinder 120. That is, the cylinder 120 may be inserted into an accommodation groove defined in the frame 110. Also, the discharge cover assembly 160 may be coupled to a front surface of the frame 110 by using a coupling member.

The compressor body 100 may further include the motor 140.

The motor 140 may include an outer stator 141 fixed to the frame 110 to surround the cylinder 120, an inner stator 148 disposed to be spaced inward from the outer stator 141, and a permanent magnet 146 disposed in a space between the outer stator 141 and the inner stator 148.

The permanent magnet 146 may linearly reciprocate by a mutual electromagnetic force between the outer stator 141 and the inner stator 148. Also, the permanent magnet 146 may be provided as a single magnet having one polarity or be provided by coupling a plurality of magnets having three polarities to each other.

The permanent magnet 146 may be disposed on the magnet frame 138. The magnet frame 138 may have an approximately cylindrical shape and be disposed to be inserted into the space between the outer stator 141 and the inner stator 148.

In detail, referring to the cross-sectional view of FIG. 4, the magnet frame 138 may be bent forward after extending from the outer circumferential surface of the piston flange part 132 in the radial direction. The permanent magnet 146 may be fixed to a front end of the magnet frame 138. Thus, when the permanent magnet 146 reciprocates, the piston 130 may reciprocate together with the permanent magnet 146 in the axial direction.

The outer stator 141 may include coil winding bodies 141*b*, 141*c*, and 141*d* and a stator core 141*a*. The coil winding bodies 141*b*, 141*c*, and 141*d* may include a bobbin 141*b* and a coil 141*c* wound in a circumferential direction of the bobbin 141*b*. Also, the coil winding bodies 141*b*, 141*c*, and 141*d* may further include a terminal part 141*d* that guides a power line connected to the coil 141*c* so that the power line is led out or exposed to the outside of the outer stator 141.

The stator core 141*a* may include a plurality of core blocks in which a plurality of laminations are laminated in a circumferential direction. The plurality of core blocks may be disposed to surround at least a portion of the coil winding bodies 141*b* and 141*c*.

A stator cover 149 may be disposed on one side of the outer stator 141. That is, the outer stator 141 may have one side supported by the frame 110 and the other side supported by the stator cover 149.

The linear compressor 10 may further include a cover coupling member 149*a* for coupling the stator cover 149 to the frame 110. The cover coupling member 149*a* may pass through the stator cover 149 to extend forward to the frame 110 and then be coupled to the frame 110.

The inner stator 148 is fixed to an outer circumference of the frame 110. Also, in the inner stator 148, the plurality of laminations are laminated outside the frame 110 in the circumferential direction.

The compressor body 100 may further include a support 137 for supporting the piston 130. The support 137 may be coupled to a rear portion of the piston 130, and the muffler 150 may be disposed to pass through the inside of the support 137. The piston flange part 132, the magnet frame 138, and the support 137 may be coupled to each other by using a coupling member.

A balance weight 179 may be coupled to the support 137. A weight of the balance weight 179 may be determined based on a driving frequency range of the compressor body 100.

The compressor body 100 may further include a back cover 400 coupled to the stator cover 149 to extend backward.

In detail, the back cover 400 may include three support legs, but is not limited thereto, and the three support legs may be coupled to a rear surface of the stator cover 149. A spacer 181 may be disposed between the three support legs and the rear surface of the stator cover 149. A distance from the stator cover 149 to a rear end of the back cover 400 may be determined by adjusting a thickness of the spacer 181. Also, the back cover 400 may be spring-supported by the support 137.

The compressor body 100 may further include an inflow guide part 156 coupled to the back cover 400 to guide an inflow of the refrigerant into the muffler 150. At least a portion of the inflow guide part 156 may be inserted into the suction muffler 150.

The compressor body 100 may further include a plurality of resonant springs 440 and 450 that are adjusted in natural frequency to allow the piston 130 to perform a resonant motion.

The plurality of resonant springs 440 and 450 may include a first resonant spring 440 supported between the support 137 and the stator cover 149 and a second resonant spring 450 supported between the support 137 and the back cover 400. The piston 130 that reciprocates within the linear compressor 10 may stably move by the action of the plurality of resonant springs 440 and 450 reduce the vibration or noise due to the movement of the piston 130.

The compressor body 100 may further include a plurality of sealing members 127 and 128 for increasing coupling force between the frame 110 and the peripheral parts around the frame 110.

In detail, the plurality of sealing members 127 and 128 may include a first sealing member 127 disposed at a portion at which the frame 110 and the discharge cover 165 are coupled to each other. The plurality of sealing members 127 and 128 may further include a second sealing member 128 disposed at a portion at which the frame 110 and the cylinder 120 are coupled to each other.

Each of the first and second sealing members 127 and 128 may have a ring shape.

The plurality of support devices 200 and 300 include a first support device 200 coupled to one side of the compressor body 100 and a second support device 300 coupled to the other side of the compressor body 100.

The first support device 200 may be fixed to the first shell cover 102, and the second support device 300 may be fixed to the shell 101.

Figure 5:
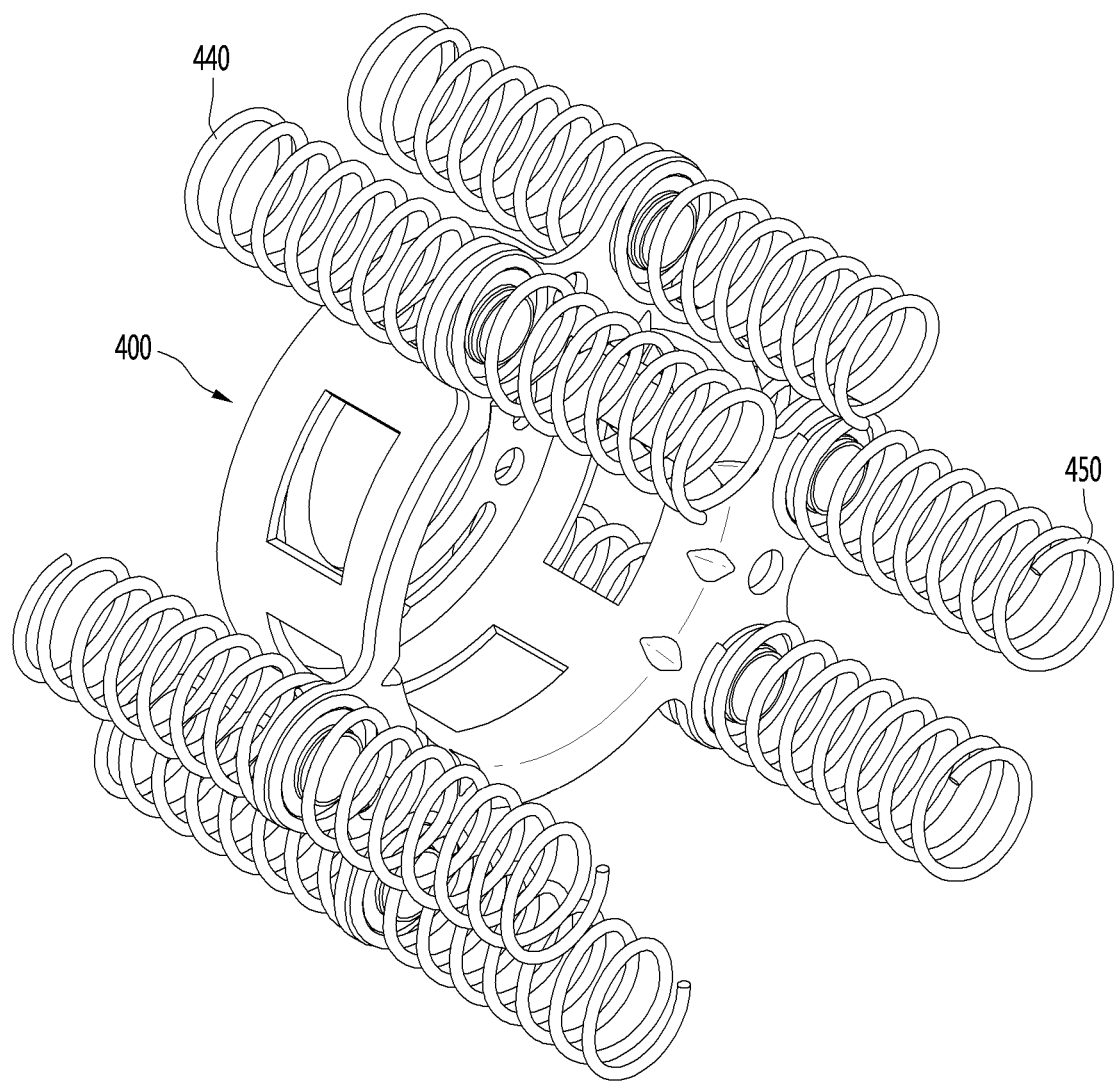
FIG. 5 is a view illustrating a state in which a resonant spring is connected according to an embodiment of the present invention.
Figure 6:
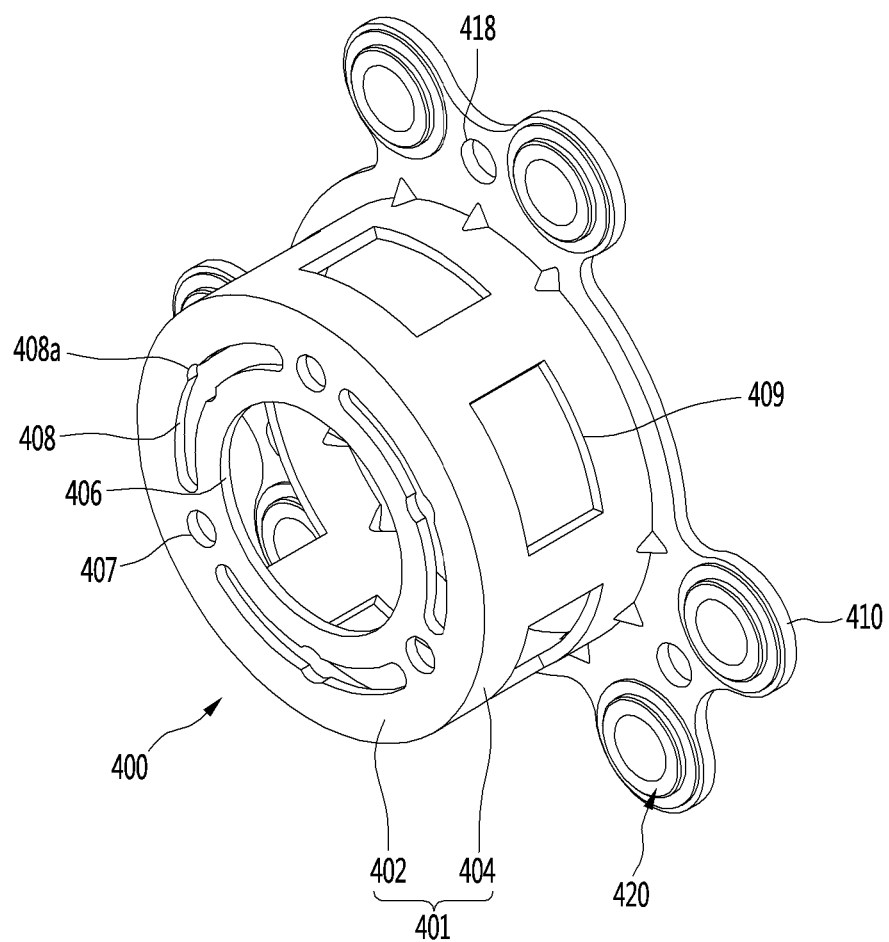
FIGS. 6 and 7 are perspective views of the support according to an embodiment of the present invention.
Figure 7:
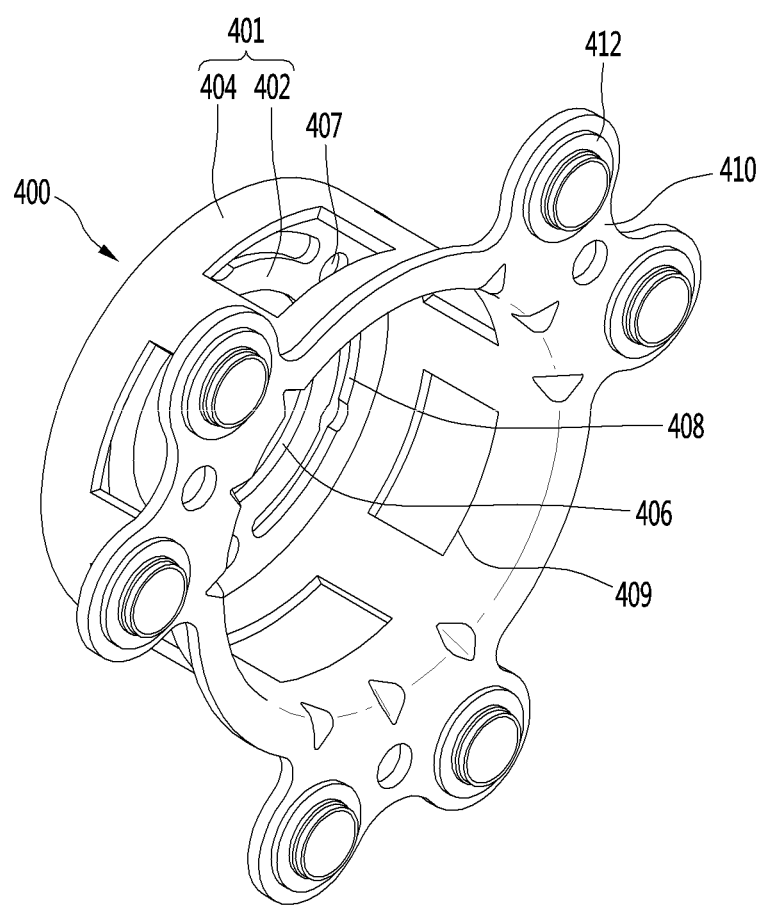
Figure 8:
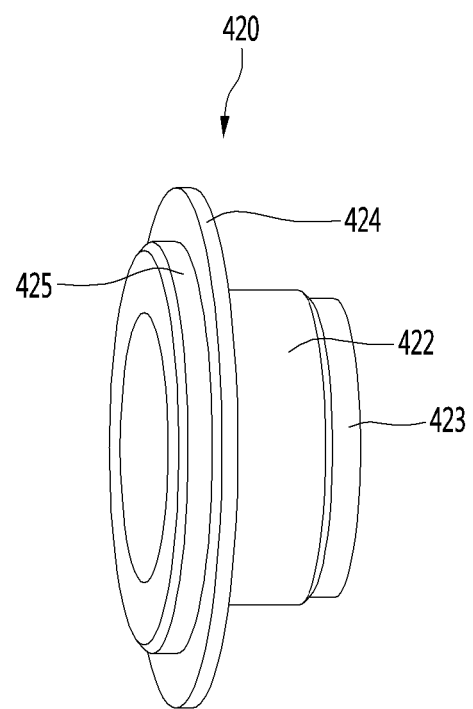
FIG. 8 is a perspective view of a support cap for supporting the resonant spring.
Figure 9:
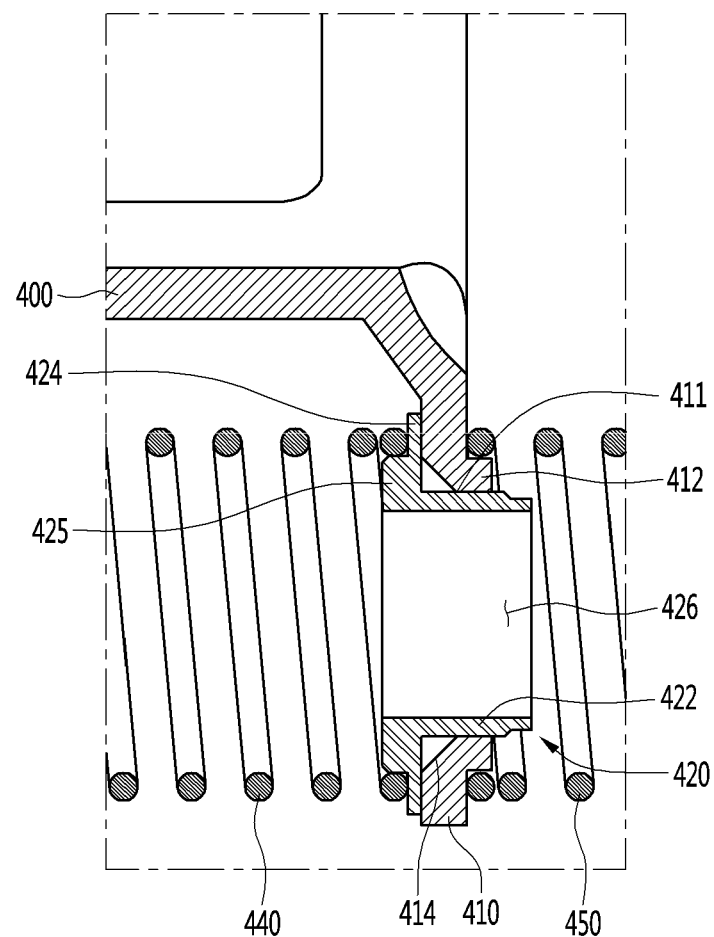
FIG. 9 is a view illustrating a state in which the support cap and the support support the resonant springs in a state in which the support cap is coupled to the support.

FIG. 5 is a view illustrating a state in which the resonant spring is connected according to an embodiment of the present invention, FIGS. 6 and 7 are perspective views of the support according to an embodiment of the present invention, FIG. 8 is a perspective view of the support cap for supporting the resonant spring, and FIG. 9 is a view illustrating a state in which the support cap and the support support the resonant springs in a state in which the support cap is coupled to the support.

Referring to FIGS. 5 to 9, the support 400 may include a support body 401 having a cylindrical shape. However, in this specification, this embodiment is not limited to the cylindrical shape of the support body 401.

The support body 401 may be connected to the piston 130. The support body 311 may include a coupling part 402 coupled to the piston 130 and a circumferential part 404 disposed on a circumference of the coupling part 402.

The circumferential part 404 may extend from the coupling part 402 in an axial direction of the compressor body 100. Here, the circumferential part 404 may extend from the coupling part 402 in a direction that is away from the piston 130.

In a state in which the magnet frame (see reference numeral 138 of FIG. 4) contacts the coupling part 402, and the piston flange part 132 contacts the magnet frame 138, the coupling member is coupled to the coupling part 402, the magnet frame 138, and the piston flange part 132.

An opening 406 through which the suction muffler 150 passes may be defined in a center of the coupling part 402. A plurality of coupling holes 407 may be defined in a position where is spaced apart from the opening in a circumferential direction of the opening 406.

In a state where the piston frame contacts the coupling part 402, and the piston flange part 132 contacts the piston frame 138, the coupling member is coupled to the coupling part 402, the piston frame 138, and the piston flange part 132. That is, in a state where the piston frame 138 is inserted between the coupling part 402 and the piston flange part 132, the coupling member sequentially passes through the coupling hole 407, the piston frame 138, and the piston flange part 132 from the coupling part 402.

Also, one or more air flow holes 408 may be defined in the coupling part 402 to reduce flow resistance generated while the support 400 reciprocates together with the piston 130 in the axial direction. For example, a plurality of air flow holes 408 may be defined to be spaced apart from each other in the circumferential direction of the opening 406. Each of the plurality of air flow holes 408 may have, for example, an arc shape.

A pin hole 408a may be defined in a central portion of each of the plurality of air flow holes 408. The pin hole 408a may be a hole through which an auxiliary pin (not shown) passes so that centers of the coupling part 402, the piston frame 138, and the piston flange part 132 coincide with each other before the coupling part 402, the piston frame 138, and the piston flange part 132 are coupled by using the coupling member.

Although not shown, a pin hole through which the auxiliary pin passes may be defined in each of the piston frame 138 and the piston flange part 132.

In a state in which the auxiliary pin passes through the pin holes of the coupling part 402, the piston frame 138, and the piston flange part 132, the auxiliary pin is removed from the pin hole 408a after the coupling part 402, the piston frame 138, and the piston flange part 132 are coupled by the coupling member.

One or more air flow holes 409 for reducing the flow resistance generated while the support 400 moves together with the piston 130 may be defined in the circumferential part 404. For example, a plurality of air flow holes 409 may be defined to be spaced apart from each other in the circumferential direction of the circumferential part 404.

The one or more air flow holes 409 may allow the circumferential part 404 to increase in strength as well as decrease in weight.

The support 400 may further include a plurality of spring supports 410 extending from the support body 401. For example, the plurality of spring supports 410 may extend from an end of the circumferential part 404 in a direction crossing the axial direction of the compressor body 100.

According to the present invention, each of the plurality of spring supports 410 may have one surface on which a first resonant spring 440 is seated and the other surface on which a second resonant spring 450 is seated. That is, the first and second resonant springs 440 and 450 may be disposed on both sides of the spring supports 410. In this case, when the support 400 linearly reciprocates in the axial direction, the resonant spring disposed on one side of the support 400 may be compressed, but the resonant disposed on the other side of the support 400 may be extended to support the support 400. Thus, the piston may be smoothly resonant, and thus, an occurrence of noise may be minimized.

In order to allow the resonant springs to be disposed on both sides of the spring supports 410, a coupling protrusion for supporting each of the resonant springs may be preferably provided on each of one surface and the other surface of each of the spring supports 410.

Although not shown, a coupling protrusion to which one end of the first resonant spring 440 is coupled may be provided on the stator cover 149.

According to the present invention, the support 400 may be formed into a sheet metal to reduce manufacturing costs and the weight and simplify the manufacturing process.

However, when the support 400 is formed into the sheet metal, a coupling protrusion for the coupling of each of the resonant springs 440 and 450 cannot be provided on both surfaces facing each other of the spring supports 410, but be provided on only one surface.

For example, when the support 400 is manufactured, a first coupling protrusion 412 may be provided on one surface of the spring support 410 and may not be provided on the other surface of the spring support 410. One surface of the spring support 410 may be defined as a rear surface, and the other surface may be defined as a front surface.

According to the present invention, the other surface of the spring support 410 may be defined as a surface facing the first resonant spring 440, and one surface of the spring support 410 may be defined as a surface facing the second resonant spring 450.

To maintain a state in which the first resonant spring 440 is supported by the support 400, a support cap (see reference numeral 420 of FIG. 8) may be coupled to the other surface (or the front surface) of the spring support 410.

According to an embodiment of the present invention, for example, two first resonant springs 440 may be supported on the front surface of each of the spring supports 410. Also, two second resonant springs 440 may be supported on the rear surface of each of the spring supports 410.

The two first coupling protrusions 412 may be provided on the rear surface of each of the spring supports 410, and the two caps 420 may be coupled to the front surface of each of the spring supports 410. That is, the caps 420 may be inserted from the front surface toward the rear surface of each of the spring supports 410. The first coupling protrusion 412 may be defined as a protrusion having a burr shape on an edge of an insertion hole 411 into which the cap 420 is inserted.

Also, the first coupling protrusion 412 may extend from any one of the front and rear surfaces of the spring support according to a direction in which the insertion hole 411 is punched. Also, the cap 420 may be mounted on a surface opposite to the surface on which the first coupling protrusion 412 is provided. Thus, although the first coupling protrusion 412 is disposed on the rear surface of the spring support 410 in this embodiment, this embodiment is not limited thereto. For example, the first coupling protrusion 412 may be disposed on the front surface of the spring support 410.

Also, although the support cap 420 is provided in number corresponding to the number of insertion holes 411 in this embodiment, this embodiment is not limited thereto. For example, two insertion holes 441 may be inserted into one support cap 420. That is, two second coupling protrusions 425 may be provided on one support cap 420.

The support cap 420 may include a body 422 having a cylindrical shape, a seating surface 424 extending from one end of the body 422 in a radial direction, a second coupling protrusion 425 further protruding from the seating surface 424, and a tapered part 423 provided on the other end of the body 422.

The cylindrical body 422 may be inserted into the insertion hole 411 defined in the spring support 410.

The support cap 420 may be, for example, a plastic injection molding and may be fitted to be coupled to the insertion hole 411. When the support cap 420 is the plastic injection molding, an increase in weight may be minimized in the state of being coupled to the spring support 410 compare to a metallic support cap. Also, an occurrence of noise due to friction between metals may be prevented.

One end of the first resonant spring 440 or the second resonant spring 450 may be seated on the seating surface 424. Also, the seating surface 424 may have a diameter greater than that of the body 422. Also, the second coupling protrusion 425 may have a diameter less than that of the seating surface 424 and extend from the seating surface 424.

In the state where the support cap 420 passes through the insertion hole 411 of the spring support 410, the seating surface 424 may contact a surface opposite to the surface on which the first coupling protrusion 412 is disposed.

An inclined guide surface 414 may be provided on an inner surface of the insertion hole 411 of the spring support 410 so that the body 422 of the support cap 420 smoothly passes through the insertion hole 411.

The inclined guide surface 414 may be tapered to decrease in diameter in a direction in which the support cap 420 is inserted. Also, the tapered part 423 may be provided on an end of the body 422 of the support cap 420, and thus, the support cap 420 may be smoothly inserted into the insertion hole 411.

Referring to FIG. 9, one end of the first resonant spring 440 is inserted into an outer circumferential surface of the second coupling protrusion 425, and the seating surface 424 is seated on one end of the first resonant spring 440. Also, the other end of the first resonant spring 440 is supported by the stator cover 149.

Also, one end of the second resonant spring 450 is inserted into an outer circumferential surface of the first coupling protrusion 412 of the spring support 410. Also, one end of the second resonant spring 450 is seated on the rear surface of the spring support 410. The other end of the first resonant spring 450 may be supported by the back cover 170.

Here, in order to minimize the deformation of the spring support 410, the first resonant spring 440 and the second resonant spring 450 may be disposed in a line.

That is, when the first resonant spring 440 and the second resonant spring 450 are disposed in a line, a point at which the elastic force of the first resonant spring 440 is applied to the spring support 410 and a point at which the elastic force of the second resonant spring 450 is applied to the spring support 410 may coincide with each other to minimize the deformation of each of the spring supports 410.

Also, since the first resonant spring 440 and the second resonant spring 450, which are disposed on both sides of the support 400, function as a single spring, the resonant motion of the piston 130 may be smoothly performed, and side force by which the spring is pushed laterally may be reduced.

To allow the first resonant spring 440 and the second resonant spring 450 to be disposed in a line, the first coupling protrusion 412 and the second coupling protrusion 425 may have the same outer diameter, and also central axes of the first coupling protrusion 412 and the second coupling protrusion 425 may coincide with each other and be disposed at positions facing each other.

The tapered part 423 may further protrude from the first coupling protrusion 412 so that the support cap 420 is more firmly coupled to the spring support 410. That is, the body 422 may completely pass through the insertion hole 411 and the first coupling protrusion 412.

In the state in which the first resonant spring 440 is seated on the seating surface 424 of the support cap 420, the first resonant spring 440 may press the seating surface 424 in a direction (a right direction in the drawing) in which the seating surface 424 presses the spring support 410.

Thus, after the first resonant spring 440 is coupled to the support cap 420, the support cap 420 may be prevented from being separated from the spring support 410.

An air flow hole 426 functioning as the air flow hole 408 may be defined in the body 422 of the support cap 420.

Although not limited in the present invention, the support 400 may include three spring supports 410. The three spring supports 410 may be spaced an angle of about 120 degrees from each other.

Also, two second resonant springs 450 may be supported on a first surface (the rear surface) of each of the three spring supports 410, and two first resonant springs 440 may be supported by a second surface (the front surface). Thus, the support 400 may support six first resonant spring 440 and six second resonant spring 450.

According to the present invention, as the number of resonance springs supported by the support 400 increases, a spring constant of each of the resonance springs may be lowered while the integrated spring constant of the entire resonance springs remains the same. Thus, the side force by each of the springs may be reduced when compared to the compressor using twelve or less resonance springs according to the related art.

In this specification, the support 400 may be referred to as a spring device for resonating the piston 130 together with the first resonant spring 440 and the second resonant spring 450.

The invention claimed is:

1. A linear compressor comprising:
   a shell;
   a cylinder that is provided in the shell and that defines a compression space configured to receive refrigerant;
   a frame coupled to an outside of the cylinder;
   a piston configured to reciprocate in an axial direction within the cylinder;
   a motor configured to supply power to the piston; and
   a spring device connected to the piston and configured to allow the piston to resonate, wherein the spring device comprises:
      a support coupled to the piston, the support comprising a spring support that defines one or more insertion holes,
      a first coupling protrusion extending along an edge of each of the insertion holes on a rear surface of the spring support,
      a support cap inserted into one of the insertion holes, the support cap comprising a second coupling protrusion protruding toward a front surface of the spring support,
      a first resonant spring fitted into an outer surface of the second coupling protrusion, and
      a second resonant spring fitted into an outer surface of the first coupling protrusion, and
   wherein the support cap further comprises:
      a body that has a cylindrical shape and that is inserted into the one of the insertion holes, and
      a seating surface that extends from a first end of the body in a radial direction, that is in contact with the front surface of the spring support, and that supports the first resonant spring,
   wherein the body of the support cap is fitted to the one of the insertion holes, and the second coupling protrusion protrudes from the seating surface, and
   wherein the body has a second end that passes through the one of the insertion holes and that further protrudes from an end of the first coupling protrusion.

2. The linear compressor according to claim 1, wherein the second coupling protrusion has an outer diameter less than that of the seating surface, and
   wherein an end of the first resonant spring is seated on the seating surface.

3. The linear compressor according to claim 1, wherein the support cap defines an air flow hole inside the body.

4. The linear compressor according to claim 1, wherein the support cap further comprises a tapered part disposed at an outer surface of the second end of the body.

5. The linear compressor according to claim 1, wherein the spring support comprises a guide surface that is inclined with respect to the seating surface and that faces the one of the insertion holes, and
   wherein a diameter of the one of the insertion holes decreases from the front surface of the spring support to the rear surface.

6. The linear compressor according to claim 1, wherein the first coupling protrusion and the second coupling protrusion have a same diameter, and
   wherein centers of the first coupling protrusion and the second coupling protrusion are disposed in a same line.

7. The linear compressor according to claim 1, wherein the support comprises:
   a coupling part coupled to the piston; and
   a circumferential part extending from an edge of the coupling part in a direction that is away from the piston, and
   wherein the spring support extends from an end of the circumferential part in a radial direction.

8. The linear compressor according to claim 7, further comprising:
   a stator cover supporting the motor together with the frame and supporting the first resonant spring together with the support cap; and
   a back cover coupled to the stator cover and supporting the second resonant spring together with a rear surface of the spring support.

9. The linear compressor according to claim 1, wherein the first resonant spring surrounds the first end of the body.

10. The linear compressor according to claim 1, wherein the first resonant spring is disposed radially outside of the first end of the body.

11. The linear compressor according to claim 1, wherein the seating surface is in contact with the first resonant spring.

\* \* \* \* \*